Feb. 19, 1929.                          1,702,831
C. KUPFER
ESCAPEMENT MECHANISM
Filed April 4, 1927        2 Sheets-Sheet 1
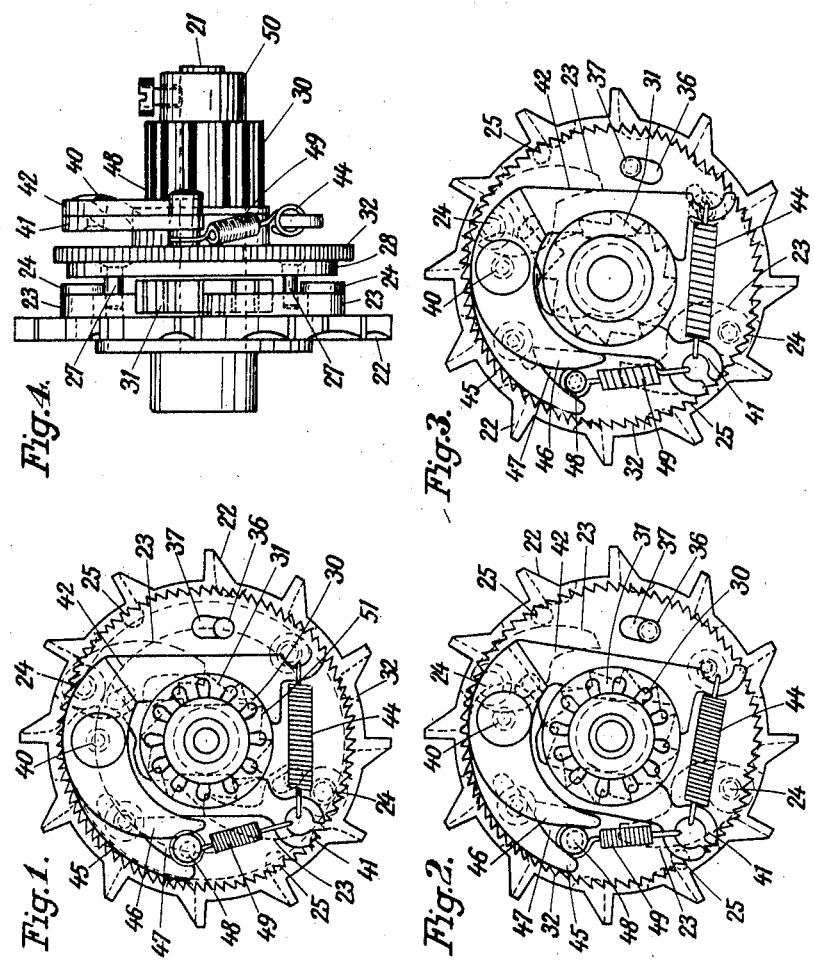
Inventor:
C. Kupfer
By: Marks & Clerk
Attys.

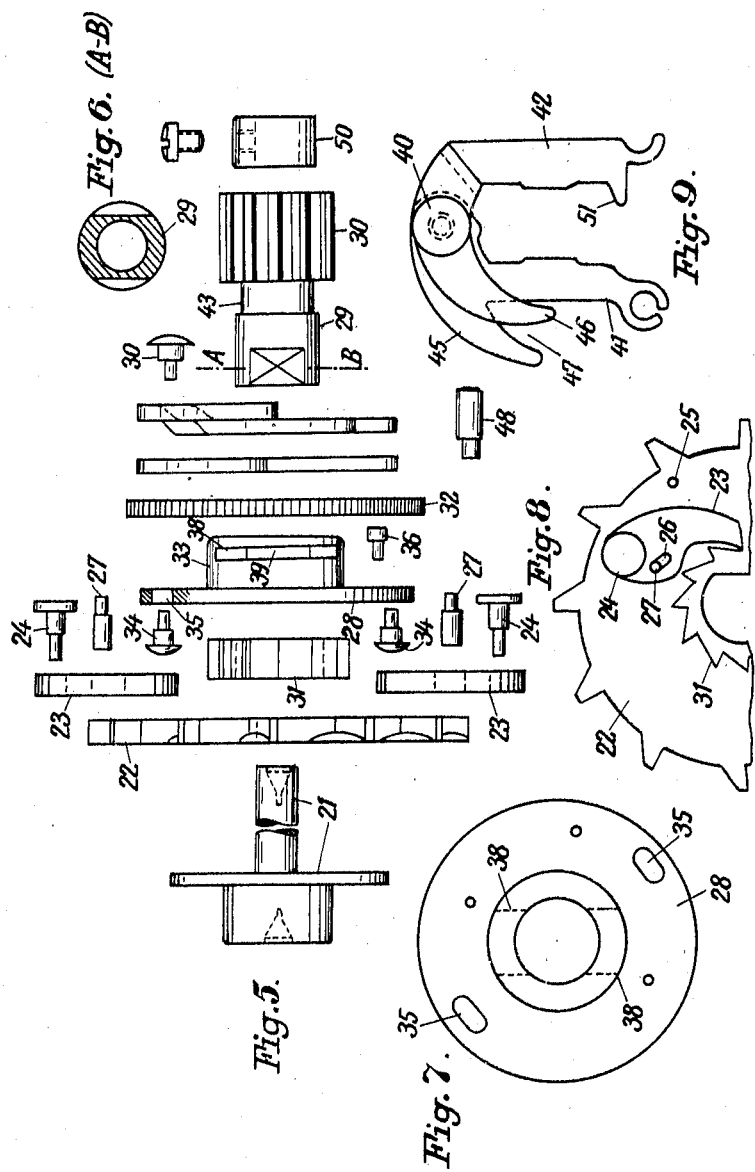

Patented Feb. 19, 1929.

1,702,831

UNITED STATES PATENT OFFICE.

CARL KUPFER, OF NUREMBERG, GERMANY, ASSIGNOR TO TRIUMPH-WERKE NURNBERG A.-G., OF NUREMBERG, GERMANY.

ESCAPEMENT MECHANISM.

Application filed April 4, 1927, Serial No. 180,971, and in Germany August 3, 1925.

This invention relates to feeding devices for the paper carriage in typewriters, and more particularly to those in which the returning of the paper carriage is noiselessly effected by temporarily releasing the clutch provided between the escapement wheel and the paper carriage driving wheel. According to the invention the releasing of this clutch, consisting of a ratchet wheel and pawls, is effected through the medium of a braking device.

The invention also relates to improvements in these known kinds of releasing devices just mentioned in feeding devices such as are expressed by the following specification and claims.

A constructional example of the invention is illustrated in the accompanying drawings, wherein—

Figures 1 to 3 show the feeding device in front elevation with its members in different positions, Figure 4 a side elevation thereof, Figure 5 the individual parts separated from one another, and Figures 6 to 9, individual parts.

Upon the shaft 21 of the feeding device is non-rotatably mounted the escapement wheel 22, which carries two pawls 23 by means of pivots 24. The radial outward movement of the pawls 23 is limited in each case by a stop pin 25 mounted in the escapement wheel. In a slot 26 in the pawls 23 there engages in each case a pin 27 on a pawl guiding disc 28, which is freely rotatable upon the hub 29 of the toothed wheel 30 meshing with the rack of the typewriter carriage.

Upon the hub 29 rotatably mounted upon the shaft 21 is non-rotatably secured between the escapement wheel 22 and the pawl guiding disc 28 the ratchet wheel 31 of the feeding device. Between the pawl guiding disc 28 and the toothed wheel 30 is rotatably mounted upon the hub 33 of the pawl guiding disc 28 a toothed disc 32, which penetrates with pins 34 through arcuate slots 35 in the pawl guiding disc 28, while the latter in its turn engages with pins 36 in arcuate slots 37 in the toothed disc 32.

The hub 33 of the pawl guiding disc 28 is flattened at two diametrically opposite positions, so that at these flattenings 38 that receive the braking device two slots 39 are produced. The braking device consists of two brake blocks 41 and 42, which are pivotally connected with one another by a pin 40 and which bear through the slots 39 in the pawl guiding disc hub 33 against a recess 43 in the hub 29 of the toothed wheel, and at their free ends are pulled towards one another by a helical spring 44. Each brake block 41, 42 comprises a crescent-shaped extension 45 and 46 respectively, between which is left a wedge-shaped space 47. In this wedge-shaped space 47 there lies a pin 48 of the toothed disc 32, which is connected by a helical spring 49 with the brake block 41. A lower beak 51 of the brake block 42 bears against the hub 33 of the pawl guiding disc 28 and secures the braking device in its position. To the end of the shaft 21 opposite to the escapement wheel 22 is secured a positioning ring 50, which holds together all the members of the feeding device, which can thus easily be taken to pieces and assembled.

The method of working of the feeding device described is as follows:—

During the rotation of the toothed wheel 30 meshing with the typewriter rack in one direction, the pawls 23 of the escapement wheel 22 place themselves in the teeth of the ratchet wheel 31, and thereby couple the escapement wheel 22 to the toothed wheel 30. When the toothed wheel 30 rotates in the opposite direction, the pawl guiding disc 28, owing to the braking device 41, 42 acting upon the hub 43 of the toothed wheel 30, is carried round with it, so far as the pins 27 in the slots 26 of the pawls 23 permit. Consequently the pawls 23 are raised by the pins 27 of the pawl guiding disc 28 and come out of engagement with the ratchet wheel 31, so that the toothed wheel 30 can rotate freely relatively to the escapement wheel 22.

The releasing levers of the decimal tabulator and of the carriage release, which are well-known and consequently not illustrated in the drawing, bear with one tooth against the toothed disc 32, thus displace the latter during their oscillation through a certain angle relatively to the escapement wheel 22, and also to the brake blocks 41 and 42 which are non-rotatably mounted upon the hub 33 of the pawl guiding disc 28. As a result of this the pin 48 of the toothed disc 32 slides further into the wedge-shaped space 47 between the two brake block projections 45 and 46, which are therefore moved farther apart against the pull of the spring 44, so that the braking action ceases. Consequently the carriage can be moved freely without any braking, and the failures existing in the case of the paper carriage feeding devices hitherto used are eliminated. Upon the return of the releasing levers of the decimal tabulator and of the carriage release, the toothed disc 32 is rotated by the spring 49 relatively to the braking device in the opposite direction, that is to say the pin 48 of the toothed disc 32 no longer separates the two crescent-shaped projections 45 and 46 of the brake blocks 41 and 42 from one another, and the latter return to their braking position.

What I claim is:—

1. A feed device for the paper carriage of a typewriting machine, comprising a toothed driving wheel meshing with the paper carriage, an escapement wheel, coupling means between said driving wheel and said escapement wheel, releasing means capable of angular displacement with respect to said driving wheel and escapement wheel for releasing said coupling means and a braking device between said releasing means and the driving wheel, for the purposes set forth.

2. A feed device for the noiseless returning of the paper carriage in a typewriting machine fitted with a tabulator, the said feed device comprising a shaft, a toothed driving wheel meshing with the paper carriage, an escapement wheel, coupling means between said toothed driving wheel and said escapement wheel, a braking device for releasing said coupling means, and a toothed disc rotatably mounted on the shaft and adapted to be oscillated relatively to the escapement wheel and thereby to eliminate the braking action of said braking device when the carriage is released from its feed mechanism by the actuation of the tabulator.

3. A feed device for the noiseless returning of the paper carriage in a typewriting machine fitted with a tabulator, the said feed device comprising a shaft, a toothed driving wheel meshing with the paper carriage and rigidly secured to said shaft, a hub on said toothed wheel, an escapement wheel rotatably mounted on said shaft, coupling means between said toothed driving wheel and said escapement wheel, brake blocks pivotally connected with one another and adapted to exert a braking action upon the hub of the toothed wheel for releasing said coupling means, a spring tending to pull said brake blocks towards one another to apply the brake, crescent-shaped extensions on the brake blocks, a toothed disc rotatably mounted on the shaft and adapted to be oscillated relatively to the escapement wheel and thereby to eliminate the braking action of said braking device when the carriage is released from its feed mechanism by the actuation of the tabulator, a pin on said toothed disc, said pin being adapted to enter between the crescent-shaped extensions and release the braking action when the toothed disc is oscillated by the actuation of the tabulator.

4. A feed device for the noiseless returning of the paper carriage in a typewriting machine fitted with a tabulator, the said feed device comprising a shaft, a toothed driving wheel meshing with the paper carriage, and rigidly secured to said shaft, a hub on said toothed wheel, an escapement wheel rotatably mounted on said shaft, coupling means between said toothed driving wheel and said escapement wheel comprising a ratchet wheel mounted fast on the shaft and pawls pivotally mounted on the escapement wheel and adapted to engage with said ratchet wheel, brake blocks pivotally connected with one another and adapted to exert a braking action upon the hub of the toothed wheel for releasing said coupling means, a pawl guiding disc rotatably mounted on the hub of the toothed wheel and adapted to lift the pawls away from the ratchet wheel, a hub on said pawl guiding disc, a toothed disc mounted on said pawl guiding disc hub and so supported as to be rotatable through a definite angle, and a spring for returning said toothed disc to its normal position upon the tabulator being set free.

In testimony whereof I have signed my name to this specification.

CARL KUPFER.